Patented Oct. 31, 1933

1,932,779

UNITED STATES PATENT OFFICE 1,932,779

PISTON PACKING

Harry F. Gray, Cleveland, Ohio, assignor to The Simplex Piston Ring Company of America, Incorporated, Cleveland, Ohio, a corporation of Ohio Application February 20, 1929. Serial No. 341,446

5 Claims. (Cl. 309—24)

My invention relates to improvements in piston packing, and more particularly to coacting piston packing rings of resilient type made relatively adjustable, by preference, and slightly and individually expansible within the piston cylinder; the object of my invention being the production of a piston packing that will be highly effective under all conditions, self-compensating for wear, and/or affording measurable adjustment as to resiliency.

In Letters Patent of Great Britain, Lockwood, No. 5,096 of 1896, there is shown and described a type of resilient piston packing employing an expansion member with spacing parts coacting with a circumferentially split ring, and in Lockwood, No. 24,993 of 1898, there is shown and described a resilient packing comprising a single circumferentially split ring having the saw cuts thereof in staggered relation in its integral body.

The present invention relates to the same general type of resilient metallic packing, but the units thereof are made up of a plurality of circular members that are of adjustable resiliency, in either or both of two respects. Thus two such members may be turned with respect to each other so that the effective resilient portions are shorter or longer, and/or one or more members may be reversed with respect to each other, in order to bring heavier or lighter resilient sections thereof into use.

The features of my improvement may be better explained by making reference to the accompanying drawing illustrating specific types of resilient metallic piston packing embodying my invention, wherein.

Throughout the several figures of the drawing, I have employed the same character of reference to indicate similar parts.

The piston packing of my invention, as indicated, comprises a plurality of resilient metallic members, when coacting with each other; these affording sufficient adjustability to compensate for wear, and/or variation in size or width of groove wherein they are cooperatively inserted. Moreover, these split annular members are positioned with their split ends so widely displaced or circumferentially staggered as to prevent leakage.

Figure 1:
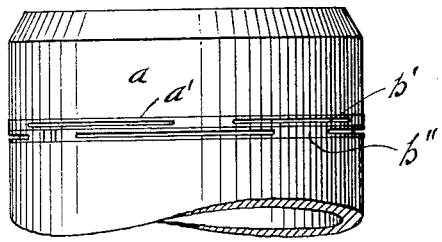
Figure 1 is a fragmentary view, in elevation, illustrating a portion of a piston with a set of piston rings positioned in a groove thereof.
Figure 2:
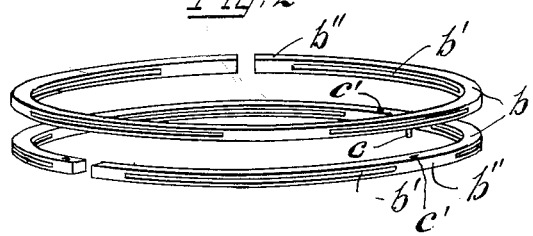
Fig. 2 is a perspective view of two of the resilient piston ring members, each being shown in perspective.
Figure 3:
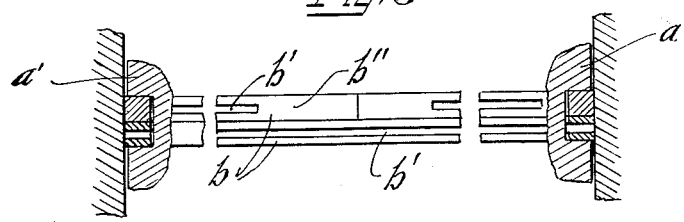
Fig. 3 is an enlarged fragmentary cross section through a piston and its cylinder, intermediately broken away.

In Figure 1 the piston $a$ is shown provided with an upper groove $a'$ wherein the piston packing, normally of slightly greater width than the groove, is operatively positioned. Two co-acting resilient ring members $b$, $b$, are shown in Fig. 2, each having a plurality of circumferentially positioned slits $b'$ and spacing solid portions $b''$. A pin $c$ is adapted to enter one of the openings $c'$, thereby holding the ring members in the same relative relation when the split rings have been inserted in groove $a'$. Together these coacting rings thus afford a resilient packing with displaced split ends which prevent leakage.

The resilience of the set of rings is adjustable by approximating or separating the portions $b''$ in their staggered relation prior to inserting the set within its groove; their circumferential relation being established by the securing pin. It will be seen that the separate ring members are independently expansible within the groove, better to accommodate any irregularities in the bore of the cylinder.

Figure 4:
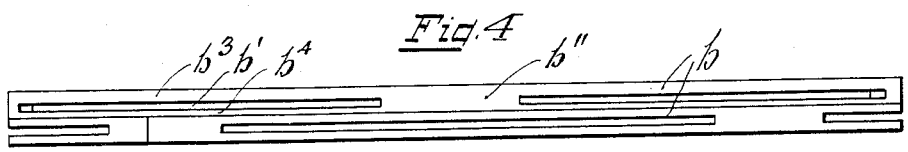
Fig. 4 is an enlarged fragmentary view illustrating a modification of the particular type of ring illustratively shown.

Referring to Fig. 4, it will be noticed that the ring members have the slits $b'$ asymmetrically positioned, in that the several saw cuts are made in a plane nearer one surface of the ring than the other, to produce relatively heavier and lighter annular portions $b^3$, $b^4$, spanning the solid portions $b''$. Thus by inverting one or both of the ring members, it is possible to modify the resilient effect of two or more of such ring members forming a coacting set within the piston groove, for the reason that the resiliency partially depends upon the contacting annular portions.

In other words, by positioning the heavier portions $b^3$ next adjacent to the solid portions $b''$ of the coacting ring member, stronger expansive effect is obtained, and vice versa. This is independent or additional to the circumferential adjustment previously explained, whereby the solid portions are positioned in variably staggered relation to shorten their supports.

It is common practice to employ expander rings interiorly of the piston grooves to supplement the peripheral expansion of the ring sections, which practice may also be availed of, if desired to insure a greater resiliency, without departing from the intent or spirit of my invention.

Having now described preferred embodiments of my invention, I claim and desire to secure by Letters Patent, together with such modifications as may be made by those ordinarily skilled in the art, the following:

1. The combination with a member having an annular groove therein, of an axially resilient ring in said groove comprising two separate axially aligned sections, each provided with normally parallel faces and alternate circumferentially slotted portions and intermediate rigid portions, the sum of the normal axial dimensions of said sections being greater than the width of the ring groove, and the rigid portion of one section being opposite the slotted portion of the other section whereby said ring when compressed and inserted in the groove will have the abutting faces of said sections concaved in the slotted portions thereof and convexed in the rigid portions.

2. The combination with a piston having a ring groove of a piston packing seated in the groove and comprising a plurality of split rings, said rings each having a series of circumferential slots providing peripherally spaced axially-resilient portions and being mounted in the ring groove in superposed relation, said rings being dimensioned to provide when superposed, an overall width exceeding the width of the ring groove by an amount not greater than the axial width of the circumferential slots whereby when the rings are arranged so that the axially resilient portions of the several rings are in staggered relation, said rings may be axially compressed to an extent permitting insertion within the ring groove.

3. A piston packing, comprising a plurality of rings, each being circumferentially slotted to provide peripherally spaced axially-resilient portions separated by non-resilient portions, the dimensions of said rings being such that the over-all width of the two rings in superposed relation exceeds that of the piston ring groove in which they are to be seated, and the axial width of the slots being at least equal to the amount by which the over-all width of the rings exceeds the width of the ring groove.

4. In combination, a piston provided with a groove, a split ring mounted in the groove and having a plurality of series of circumferentially arranged slots, the slots of each series being confined to a single horizontal plane and the plane of one series being paralleled to and spaced with respect to the plane of another series, the slots of the two series being staggered with respect to each other and separated by non-resilient portions, the intervening wall between the slots of the two series being laminated to allow said wall to flex in response to axial pressure applied to the upper and lower faces of the ring, said piston groove being of a lesser over-all axial dimension than the normal over-all axial dimension of the ring whereby to maintain the ring within the groove under sufficient axial pressure to cause flexing of said laminated wall.

5. The combination with a piston having a circumferential packing groove, of a packing arranged therein comprising a plurality of superposed split ring sections, each ring section being provided with a series of circumferentially spaced radial slots defining alternately arranged axially resilient and non-axially resilient portions, the axially resilient portions of one ring section overlying the non-axially resilient portions of another section and the splits of the ring sections being staggered, the normal overall width of the ring sections in superposed relation exceeding the width of the piston ring groove by an amount not exceeding the width of the radial slots whereby the rings may be entered in the groove when axially compressed, the non-axially resilient portions of one ring section interlocking with the axially resilient portions of an adjacent ring section whereby to prevent relative circumferential shifting of the rings.

HARRY F. GRAY.